(12) United States Patent
Stalberg et al.

(10) Patent No.: US 7,976,942 B2
(45) Date of Patent: Jul. 12, 2011

(54) SMOKE-AND STEAM-PERMEABLE FOOD SKIN MADE FROM A THERMOPLASTIC MIXTURE WITH A NATURAL APPEARANCE

(75) Inventors: Stefanie Stalberg, Taunusstein-Wehen (DE); Ulrich Delius, Frankfurt (DE); Bernhard Feron, Wiesbaden (DE)

(73) Assignee: Kalle GmbH, Wiesbaden (DE)

( * ) Notice: Subject to any disclaimer, the term of this patent is extended or adjusted under 35 U.S.C. 154(b) by 419 days.

(21) Appl. No.: 10/555,168

(22) PCT Filed: May 3, 2004

(86) PCT No.: PCT/EP2004/004646
§ 371 (c)(1),
(2), (4) Date: Nov. 1, 2005

(87) PCT Pub. No.: WO2004/098298
PCT Pub. Date: Nov. 18, 2004

(65) Prior Publication Data
US 2006/0202397 A1 Sep. 14, 2006

(30) Foreign Application Priority Data

May 6, 2003 (DE) .............. 103 20 327 U

(51) Int. Cl.
*B32B 1/02* (2006.01)
*B32B 1/08* (2006.01)
*B32B 1/04* (2006.01)

(52) U.S. Cl. ..... 428/348; 428/34.1; 428/34.2; 428/35.7; 428/35.9; 428/36.9

(58) Field of Classification Search ................. 428/34.1, 428/34.2, 35.7, 35.9, 36.9, 348
See application file for complete search history.

(56) References Cited

U.S. PATENT DOCUMENTS 4,882,367 A * 11/1989 Laroche ................. 523/212
6,589,615 B1 * 7/2003 Yen ...................... 428/34.8

FOREIGN PATENT DOCUMENTS

| WO | WO-94/16020 | 7/1994 |
| WO | WO-02/094023 | 11/2002 |
| WO | WO-03/073861 | 9/2003 |
| WO | WO-2004/065466 | 8/2004 |

* cited by examiner

*Primary Examiner* — Marc A Patterson
(74) *Attorney, Agent, or Firm* — Baker Donelson Bearman, Caldwell & Berkowitz, PC

(57) ABSTRACT

The invention relates to a single- or multi-layered food casing, made from a thermoplastic mixture which comprises at least one aliphatic polyamide and/or copolyamide, at least one or more synthetic water-soluble polymers and at least one organic and/or inorganic filler. The skin has a water vapor permeability, as determined according to DIN 53122, in the non-oriented, monoaxially or biaxially oriented state of 50 to 1500 $g/m^2 \cdot d$. The food casing is particularly suitable for use as an artificial sausage casing, particularly for raw sausages.

21 Claims, No Drawings

SMOKE- AND STEAM-PERMEABLE FOOD SKIN MADE FROM A THERMOPLASTIC MIXTURE WITH A NATURAL APPEARANCE

CROSS REFERENCE OF RELATED APPLICATION

This is a 371 national stage application of PCT/EP2004/004646, filed May 3, 2004, which claims priority from DE 103 20 327.3, filed May 6, 2003.

BACKGROUND OF THE INVENTION

1. Field of the Invention

The present invention relates to a single- or multi-layered tubular, unstretched mono- or biaxially oriented (and heatset) food casing made from a thermoplastic mixture which comprises at least one aliphatic polyamide and/or copolyamide and at least one or more synthetic water-soluble polymers and at least one organic and/or inorganic filler. On account of its high water vapor permeability, it is suitable in particular as artificial sausage casing for raw sausage varieties.

2. Description of Related Art

Food casings, especially sausage casings, are produced from natural skin, textile skin, fibrous skin or cellulose skin, collagen or plastic. Although the collagen or hide fiber skin is distinguished by a natural surface and a pleasant haptic quality, it is produced from cattle hides by a very complex and environmentally-polluting method. The hide tissue is digested to fibrils using acids (e.g. lactic acid); the high-viscosity mass is extruded and, using gaseous ammonia or ammonium hydroxide, slowly and compactly precipitated and solidified. On drying, crosslinking (curing) then takes place in order to give the products a sufficient stability, so that they withstand the scalding process without significant loss in strength. Natural skins, and also hide fiber skins, however, are finding increasingly less acceptance from the end consumers because of various incidents such as BSE disease in cattle and the misuse of antibiotics. In addition, legal restrictions are threatened. An alternative to the mentioned skins is therefore desirable. Cellulose skins, even those with fiber reinforcement, can only take over this task with restrictions. The production process is also no less complex and environmentally harmful than the collagen process.

Food casings based on synthetic polymers can, in contrast, be a real alternative. These can be produced very simply, cheaply and hygienically safely via a combined extrusion and film-forming method. However, pure plastic casings, owing to their unnatural, smooth and glossy surface, have not been able to prevail in the market sector for collagen or natural skin. In addition, they can store only a little water and show only low permeability to water vapor, which is not sufficient for raw sausage applications, since there a certain degree of drying must be achieved. In salami ripening, for example, a weight loss of about 23 to 26% after 10 ripening days is customary, which requires high-permeability casings. Furthermore, conventional plastic casings are not permeable to cold smoke (approximately 20-35° C.) and are permeable to only small amounts of hot smoke (approximately 70-80° C.). Cold smoking, however, is a standard method in the case of raw sausage varieties.

Films made from water-soluble polymers, such as poly(vinyl alcohol) and natural materials, for example starch, are described in great number. U.S. Pat. No. 5,322,866 discloses a biodegradable poly(vinyl alcohol)-starch film which, however, does not exhibit water strength. Enhanced water resistance can be achieved by adding a crosslinker or by coating the film with water-repellent substances (U.S. Pat. No. 5,106,890).

By far less moisture-susceptible are blends of water-resistant synthetic polymers, e.g. polyamides and water-soluble polymers to which, if appropriate, natural materials are also admixed. A crosslinker is generally no longer necessary in these cases, since the water-insoluble matrix substantially shields the moisture-sensitive substances from their environment.

For instance, WO 94/16020 describes biodegradable blends of two polymers of which each is itself already biodegradable. As first polymer, mention is made, inter alia, also of polyamide (nylon), as second component, inter alia, poly(vinyl alcohol) (PVAL), polylactide and other aliphatic polyesters. Optionally, in addition, a polysaccharide can be admixed. On extraction with water, the poly(vinyl alcohol) fraction is extracted from articles produced from said blends so that, a high-porosity sponge-like surface, visible under the electron microscope, results. Such a material is therefore unsuitable for the use for films for coating moist foods.

U.S. Pat. No. 4,611,019 describes blends of thermoplastic poly(vinyl alcohol) and a small fraction of polyamide or polyester which, compared with pure poly(vinyl alcohol) is said to have the advantage of a high gas barrier at low moistures and in particular at elevated moistures.

In the abovementioned prior art, the permeation of (smoke) gases and water vapor does not play a role and is even unwanted. Generally, the biodegradability is in the foreground. Natural appearance and pleasant haptic quality are of secondary importance here.

WO 02/078455 discloses a thermoplastic system made of polyamide and water-soluble polymers in combination with readily smokeable food casings. The use of a natural substance component (as filler or in thermoplasticized form) or of an inorganic filler is not absolutely necessary. Owing to their unnatural, smooth and glossy surface, such food casings have not been able to establish themselves in the market sector for collagen skin or natural skin or fiber skin.

SUMMARY OF THE INVENTION

It is therefore an object of the invention to find a true alternative to collagen skin, natural skin or fiber skin which avoids the disadvantages of the prior art. Especially, they are to distinguish themselves by a particularly natural appearance and a pleasant haptic quality and be able to be mistaken for the collagen skin, natural skin and fiber skin. Such a food casing is to be water-resistant even without curing, i.e. to exhibit no transfer of the water-soluble polymer to the surroundings under the action of (hot) water. It is to be capable of extrusion without decomposition and to be processable to form tubular films and also have high smoke permeability and water vapor permeability which are to be able to be set specifically within wide ranges via the formula.

The object was achieved by a single- or multi-layered food casing made from a thermoplastic mixture which comprises at least one aliphatic polyamide and/or copolyamide and at least one or more synthetic water-soluble polymers, wherein the thermoplastic mixture comprises at least one organic and/or inorganic filler, the casing, in the unstretched, monoaxially or biaxially stretched state, having a water vapor permeability, determined as specified in DIN 53122, of 50 to 1500 g/m²·d. The water vapor permeability of the unstretched or monoaxially stretched casing is preferably 100 to 1200 g/m²·d, particularly preferably 125 to 1100 g/m²·d, especially 150 to 1000 g/m²·d, very particularly 175 to 900 g/m²·d, in particular 200 to 800, more particularly 225 to 700 g/m²·d or even 250 to 600 g/m²·d. The water vapor permeability of the biaxially stretched casing is preferably 100 to 1200 m²·d, particularly preferably 125 to 1100 g/m²·d, especially 150 to 1000 g/m²·d, very particularly 175 to 900 g/m²·d, in particular 200 to 800 g/m²·d, more particularly 225 to 700 g/m²·d, and even 250 to 600 g/m²·d.

DETAILED DESCRIPTION OF THE INVENTION

The inventive casing is distinguished by a particularly natural appearance and a pleasant haptic quality and is able to be mistaken for the collagen skin, natural skin and fiber skin. Such a food casing is water-resistant even without curing, i.e. it exhibits no transfer of the water-soluble polymer to the surroundings under the action of (hot) water. It can be extruded without decomposition and can be processed to form tubular films and has high smoke permeability and watervapor permeability which are able to be set specifically within wide ranges via the formula.

Preferred (co)polyamides of this type are nylon-6 (poly(ε-caprolactam)=homopolymer of ε-caprolactam or 6-aminohexanoic acid), nylon-6.6 (poly(hexamethylene adipamide)=polyamide of hexamethylenediamine and adipic acid), nylon-6/6.6 (copolyamide of ε-caprolactam, hexamethylenediamine and adipic acid), nylon-6/66.9 (copolyamide of ε-caprolactam, hexamethylenediamine, adipic acid and azelaic acid), nylon-6/66.12 (copolyamide of ε-caprolactam, hexamethylenediamine, adipic acid and laurolactam), nylon-6.9 (polyamide of hexamethylenediamine and azelaic acid), nylon-6.10 (poly(hexamethylene sebacamide)=polyamide of hexamethylenediamine and sebacic acid), nylon-6.12 (polyamide of ε-caprolactam and ω-aminolaurolactam), nylon-4.6 (poly(tetramethylene adipamide)=polyamide of tetramethylenediamine and adipic acid) or nylon-12 (poly(ε-laurolactam)=homopolymer of laurolactam). The copolyamides also comprise heterofunctional polyamides, in particular polyetheramides, polyesteramides, polyetheresteramides and polyamideurethanes. Among these polymers, preference is given to those having block-type distribution of the various functionalities, what are termed block copolymers. Particular preference is given to poly(ether block amides). The (co)polyamide produces especially a higher rigidity of the film and in the case of the heterofunctional polyamides, an improved smoke permeability.

The fraction of the aliphatic (co)polyamide is generally 2 to 99% by weight, preferably 5 to 95% by weight, particularly preferably 10 to 90% by weight, in particular 15 to 85% by weight, very particularly 20 to 80% by weight, more particularly 25 to 75% by weight, or else 28 to 70% by weight, in each case based on the total weight of the mixture.

The water-soluble synthetic polymer preferably originates from one of the groups:
a) poly(vinyl alcohol) (PVAL), obtained by partial or complete saponification of poly(vinyl acetate), and also copolymers of vinyl alcohol with propen-1-ol,
b) poly(alkylene glycol)s, in particular poly(ethane-1,2-diol), poly(propane-1,2-diol) or a corresponding copolymer,
c) polyvinylpyrrolidone or water-soluble copolymers of vinylpyrrolidone with at least one α,β-olefinically unsaturated monomer building block,
d) polymers of N-vinylalkylamides, e.g. poly(N-vinylformamide), poly(N-vinylacetamide) or
e) (co)polymers of acrylic acid and/or of acrylamide.

Of these groups, a) is particularly preferred. Very particular preference is given to PVAL having a mean molecular weight $M_w$ in the range 10 000 to 50 000 and a degree of saponification of the acetate groups in the range 75 to 98%.

The fraction of the water-soluble synthetic polymer is generally 1 to 50% by weight, preferably 3 to 45% by weight, particularly preferably 5 to 40% by weight, in particular 7 to 35% by weight, very particularly 9 to 30% by weight, more particularly 11 to 25% by weight or else 13 to 20% by weight, in each case based on the total weight of the thermoplastic mixture.

Water-soluble synthetic polymers, in particular poly(vinyl alcohol) (PVAL) have already been used for a relatively long time for producing certain semipermeable membranes. Membranes are produced in principle from solution; the film produced by a precipitation process must then be cured to eliminate the water solubility. Little is hitherto known on thermoforming of water-soluble polymers. Owing to their high polarity and the associated intermolecular interactions, their melting point is usually significantly above the decomposition temperature. Articles made from water-soluble polymers must, in addition, be subjected to subsequent curing treatment in order to make them moisture-resistant in the later application.

The thermoplastic mixture comprises according to the invention at least one further filler which can be of organic or inorganic origin. In particular including an organic filler gives rise to permeation values several times better compared with the unfilled system. The good water storage capacity of a collagen skin can be adapted by suitable choice of filler. Mold growth is possible on the casing; growth is promoted by natural substances and by substances which swell on water contact. The casing exhibits a sufficiently high caliber stability ($\sigma_{15}$ value greater than 8 N/mm²) and may be peeled off without problem from the food (generally a sausage meat emulsion). It is therefore generally suitable as artificial sausage casing, preferably for raw sausage varieties such as air-dried, smoked and unsmoked and also mold-ripened raw sausage varieties.

As organic filler, in particular carbohydrates come into consideration. They can comprise a natural polysaccharide and/or a derivative thereof. Branched and crosslinked polysaccharides and their derivatives are likewise suitable. Proteins are suitable with restrictions, since, at the high processing temperatures, they are to a large part decomposed.

Particularly suitable polysaccharides are, e.g. plant powders, fibers, fibrids or pulp of cellulose. They should have mean particle sizes or fiber lengths of 5 to 3000 μm, preferably 10 to 1000 μm, particularly preferably 15 to 500 μm, especially 20 to 300 μm, more particularly 25 to 250 μm, or else 30 to 200 μm. These comprise plant hairs or seed fibers, such as cotton, kapok or akon, bast fibers such as flax or linen, hemp, jute, sunn, kenaf, urena, roselle or ramie, hard fibers (sisal, henequen, manila, fique, phormium, alfalfa, peat, straw, yucca), fruit fibers (coconut, pineapple, apple, orange), soft- and hard-wood fibers (spruce, pine, cork flour), other plant fibers, such as tillandsia, and also fibers from wheat, potatoes, tomatoes or carrots.

Use can also be made of native starch, for example from potatoes, manioc, Maranta (=arrowroot), sweet potato, wheat, corn, rye, rice, barley, millet, oat, sorghum, chestnut, acorns, beans, peas, bananas, palm pith (sago). Corn starch is preferred. The ratio of amylose to amylopectin in the various starches can vary here. The molecular weight $M_w$ is expediently about 50 000 to 10 000 000.

Starch derivatives are, for example, grafted native starches. Grafting agents are, in particular, maleic anhydride, succinic anhydride or ε-caprolactone. In addition, starch esters are suitable, in particular starch xanthogenates, acetates, phosphates, sulfates, nitrates, maleates, propionates, butyrates, lauroates and oleates. In addition, starch ethers, such as starch methyl ether, ethyl ether, propyl ether, butyl ether, alkenyl ether, hydroxyethyl ether, hydroxypropyl ether. Oxidized starches such as dialdehyde starch, carboxy starch or starch degraded by persulfate are likewise suitable.

In addition, crosslinked carbohydrates are usable. These are crosslinked, for example, by urea derivatives, urotropin, trioxane, di- or polyepoxides, di- or polychlorohydrins, di- or polyisocyanates, carbonic acid derivatives, diesters or inorganic polyacids, such as phosphoric acid or boric acid.

In addition, as natural substance component, the following are suitable: olive stone flour, xanthan gum, gum arabic, gum gellan, gum ghatti, gum kraya, tragacanth gum, emulsan, rhamsan, wellan, schizophyllan, polygalacturonates, laminarin, amylose, amylopectin and also pectins. The following can also be used, alginic acid, alginates, carrageenan, furcellaran, guar gum, agar-agar, tamarind gum, aralia gum, arabinogalactan, pullulan, carob bean gum, chitosan, dextrins, 1,4-α-D-polyglucan. The molecular weight $M_w$ of said carbohydrates is generally 500 to 100 000.

Use can also be made of synthetic fibers or powders (e.g. polyethylene, polypropylene, polyamide, polyacrylonitrile, polyester fibers). Those which are preferably suitable are synthetic high-temperature-stable fibers or powders based on fluoropolymers, polysulfones, poly(ether sulfone)s, poly (ether ketone)s, poly(phenylene sulfide)s, polyaramids, polyimides, aromatic polyesters, polyquinoxalines, polyquinolines, polybenzimidazoles, liquid crystal polymers or conducting polymers. Their mean fiber length or particle size is generally 5 to 3000 µm, preferably 10 to 1000 µm, particularly preferably 15 to 500 µm, especially 20 to 300 µm, more particularly 25 to 250 µm, very particularly 30 to 200 µm.

Materials which are likewise suitable are inorganic fibers of glass (e.g. glass fibers, glass filaments, glass staple fibers), short fibers of rock wool (basalt wool, slag wool, mineral wool fibers), fillers or reinforcing materials of carbonates (e.g. chalk, limestone flour, calcite, precipitated calcium carbonate, magnesium carbonate, dolomite, barium carbonate), sulfates, e.g. barium sulfate, calcium sulfate), silicates (e.g. talc, pyrophyllite, chlorite, hornblende, mica, kaolin, wollastonite, slate powder, precipitated Ca, Al, Ca/Al, Na/Al silicates, feldspars, mullite, zeolites) silicic acids (e.g. quartz, fused silica, cristobalite, kieselguhr, Neuburg silica, precipitated silicic acid, pyrogenic silicic acid, glass flour, pumice flour, perlite, (micro)glass beads, for example solid glass beads, aluminosilicate hollow beads, Ca metasilicates), oxides (e.g. aluminum hydroxide, magnesium hydroxide, titanium dioxide, silicon dioxide) and others, e.g. carbon fibers. The inorganic filler can be modified by an adhesion promoter to improve its compatibility with the surrounding plastic matrix. It can also be coated, for example in order to give it color or modify a preexisting color. The mean equivalent bead diameter of the filler particles is generally greater than 0.1 µm, preferably >1 µm, particularly preferably >5 µm, in particular >10 µm, very particularly preferably >12 µm, >15 µm, >18 µm, more particularly >21 µm, >25µm, >28 µm, >31 µm, >34 µm, >37 µm, or even >40 µm, >43 µm, >46 µm or >50 µm. The equivalent bead diameter of the largest particles should preferably not exceed 3000 µm. Particularly preferably, the mean equivalent diameter is less than 1500 µm, particularly preferably less than 1000 µm, very particularly preferably less than 500 µm, and especially less than 250 µm. Particular preference is given to microglass beads having a mean particle size of 1 to 250 µm, preferably 2 to 150 µm.

The fillers generally give the casing a very natural matt-silk optical and haptic quality. The surface receives a slight roughness which can be set by the type of filler. In addition, the ability of the casing to coil can be influenced by the filler fraction. In addition, the filler acts as reinforcer, as a result of which the caliber stability of the filled material is significantly increased compared with the unfilled material. Finally, fillers, in particular organic fillers, cause increased smoke permeability which can likewise be set by type and fraction. The casing is suitable for hot smoking (>50° C.), for warm smoking (25-50° C.) and for cold smoking (up to 25° C.). The intensity of the smoke aroma transferred to the sausage and of the smoke color increases with increasing temperature of the smoking gas. Furthermore, the smoke, owing to its aldehydic, phenolic and acidic constituents, has a preservative, antioxidant and solidifying action.

The good water storage capacity is imitated in the inventive casing by fillers which are highly swellable and act like superabsorbers. This improves, for example, their ripening behavior in raw sausage varieties and reduces the drip losses of scalded-emulsion sausages in the overpackage. Suitable substances are, in particular, sulfate-, carboxylate- or phosphate-containing substances or those having quaternary ammonium groups. Likewise, highly swellable neutral substances are suitable. The materials can be crosslinked, uncrosslinked, branched or linear. Those which come into consideration are, e.g., natural organic thickeners such as agar-agar, alginates, pectins, carrageenans, tragacanth, gum arabic, guar seed flour, carob bean flour and gelatin, but in addition also modified organic natural substances such as (sodium) carboxymethylcellulose, sodium carboxymethylethylcellulose, methylhydroxyethylcellulose, methylhydroxypropylcellulose, hydroxyethylcellulose and carboxymethylstarch. Those which can be used are, in addition, inorganic thickeners (e.g. silica or polysilicic acid), clay minerals such as montmorillonite or zeolites. Fully synthetic thickeners which can be used are vinyl polymers, polycarboxylic acids, polyethers, polyimines and polyamides. In addition, superabsorbers based on polyacrylate or polymethacrylate.

The total fraction of filler is generally 1 to 50% by weight, preferably 2 to 45% by weight, particularly preferably 3 to 40% by weight, very particularly preferably 5 to 30% by weight, especially 6 to 25% by weight, in particular 8 to 21% by weight, 9 to 19% by weight and 11 to 15% by weight, in each case based on the total weight of the thermoplastic mixture. At a high filler fraction, the casing can tear like paper and can be particularly readily uncoiled, e.g. by the sausage meat emulsion.

The use of a plasticizer is advisable. Processing on film-blowing equipment is simplified by the fact that the material is less brittle. In addition, owing to the better breakdown of the filler component, a more homogeneous film structure is obtained, which is desirable for certain applications.

Preferred plasticizers are dimethyl sulfoxide (DMSO), butane-1,3-diol, glycerol, water, ethylene glycol, butylene glycol, diglyceride, diglycol ether, formamide, N-methylformamide, N,N-dimethylformamide (DMF), N,N-dimethylurea, N,N-dimethylacetamide, N-methylacetamide, polyalkylene oxide, glycerol mono-, di- or triacetate, sorbitol, erythritol, mannitol, gluconic acid, galacturonic acid, glucaric acid, glucuronic acid, polyhydroxycarboxylic acids, glucose, fructose, sucrose, citric acid or citric acid derivatives or poly(vinyl alcohol). Type and fraction of plasticizer(s) depend on the fillers which are respectively chosen and may be optimized by simple preliminary experiments.

The fraction of plasticizer is up to 40% by weight, preferably 1 to 35% by weight, particularly preferably 2 to 30% by weight, very particularly preferably 5 to 25% by weight, especially 10 to 20% by weight, in each case based on the total weight of the thermoplastic mixture.

If desired, the inventive casing can be colored by dyes and/or pigments. On stretching, cavities (vacuoles) can form around the pigment particles. The vacuoles increase still further the smoke permeability of the film. The dyes or pigments are expediently added to the thermoplastic mixture before extrusion. In addition, if required, additives can be added which affect emulsion adhesion. Those which are suitable in principle are nitrogenous and carboxyl-containing compounds. Improved emulsion adhesion can also be achieved by physical methods, such as corona treatment.

In the single-layered embodiment, the casing essentially comprises the abovementioned thermoplastic mixture. The casing according to the invention can, however, also be multilayered. It then generally comprises 2 to 5 layers. The material for the further layers is selected in such a manner that the desired water vapor permeability is not impaired. Multilayered casings may be produced, for example, by coextrusion using a multilayer ring die. The layer of the filler-containing thermoplastic mixture expediently forms the outer layer. However, fillers can also be present in one or more of the further layers. The total thickness of the multilayered casing is generally in the same region in which the total thickness of the single-layered casing lies.

The casing according to the invention may be produced in a hygienically safe manner in uniform quality. The production method is significantly simpler than the collagen process. Finally, the casing can be finally processed by known methods (printing, ring formation, shirring).

The inventive food casing is generally produced by a tubular film-blowing method or by biaxial stretch orientation.

The film obtained in the tubular film-blowing method is called, in the context of the present invention, "unstretched tubular film". This expression means those films which are extended only in the molten state, but are not extended at temperatures below the crystallization temperature or softening temperature in the case of amorphous materials. In this case the extruded tube is stretched in the peripheral direction (transverse direction) by blowing and in the longitudinal direction by take-up rolls. Since the deformation takes place directly from the melt, the degree of orientation of the polymer chains is low and negligible. These are described as non-oriented films.

In biaxial stretch orientation, firstly a tube having relatively high wall thickness is produced by extrusion. This is inflated only little or not at all. Subsequently what is termed the primary tube is cooled. Not until a later step is the primary tube heated to the temperature necessary for biaxial stretch orientation and then biaxially stretch-oriented by an internally acting gas pressure and by take-up rolls. This achieves a high degree of orientation of the polymer chains. The longitudinal and transverse stretching ratio is in the range which is generally customary in practice. However, it is also a function of the type and content of the materials used.

The seamless tubular casing preferably has a thickness of 40 to 200 μm if it is produced by a tubular film-blowing method and a thickness of 25 to 75 μm if it is obtained by biaxial stretch orientation (double-bubble method). Seamless tubular casings which are to be used as artificial sausage casings are preferably produced by biaxial stretch orientation. After the biaxial stretch orientation there expediently follows a partial or complete heat setting. The heat setting can establish the shrinkage of the casing to a desired value. Artificial sausage casings generally have a shrinkage of less than 25% in longitudinal and transverse direction when they are placed for 1 min in water at 90° C.

The tubular casing can then be finally processed to form sections tied off at one end or shirred in sections to give shirred sticks. In addition, it can be curved into what is termed a circular skin. For this, the casing is exposed on one side to heat radiation or hot air. Special natural skin shapes such as fat ends are also possible. Methods and apparatuses for making ring shapes of polymer casings are familiar to those skilled in the art.

The inventive casing is used especially as artificial sausage casing, in particular for raw sausage varieties.

In the exemplary embodiments hereinafter, the individual properties are measured in accordance with the cited standards and methods.

Measurement Methods

Water Vapor Permeability (WVP)

The WVP was determined as specified in DIN 53 122.

$\sigma_{15}$ Value

The ($\sigma_{15}$ value) was determined as specified in DIN 53 455. It is the force which acts on a sample to extend it by 15%.

Tear Strength, Elongation at Break

The tear strength and elongation at break were determined as specified in DIN 53 455.

Roughness

The roughness values were determined as specified in DIN 4768.

Glossiness

The glossiness was determined as specified in DIN 67 530.

EXAMPLES

The examples were produced in accordance with the methods described hereinafter. Percentages are percentages by weight unless stated otherwise or obvious from the context. The components mentioned in the examples were in each case mixed and thermoplasticized in a twin-screw extruder.

I. Production of the Granules Used

Variant A

Compound of Water-soluble Polymers and Plasticizer

In a stirred tank having jacket liquid heating and wall-scraping agitator, 75% by weight of poly(vinyl alcohol) was charged at room temperature. Then, with stirring at approximately 1000 rpm, first 15% by weight of poly(ethylene glycol) and thereafter 7.5% by weight of glycerol and also 2.5% by weight of water were added, in each case based on the total mass of the mixture. The tank contents were heated to 100 to 110° C., stirred for 15 min at this temperature and, with further stirring, cooled back to 30 to 40° C. The resultant powder was metered by a metering apparatus into a heated twin-shaft kneader (cylinder diameter 25 mm, L/D ratio 36) having a single-orifice exit die, so as to give a mass flow rate of 8 kg/h. The screw speed was 250 rpm, the heaters were set to temperatures of 120° C. (feed site) increasing downstream up to 180° C. (die). The water-clear exiting rod was cooled on an air-cooling section and then divided by means of a rod chopper to give granules. The resultant granules are termed hereinafter poly(vinyl alcohol) compound (A).

Variant B

The organic filler was first charged into the extruder and admixed with a plasticizer. The temperature in the extruder was increased over a plurality of zones from about 90 to about 180° C. The mixture of (co)polyamide and poly(vinyl alcohol) compound (A) or another water-soluble polymer was then fed into the extruder and mixed with the remaining constituents at temperatures between 170 and 260° C. (depending on the melting point of the polyamide) and the thermoplastic melt formed therefrom extruded. The extrudate was finally comminuted to form granules.

Variant C

First, the mixture of (co)polyamide and poly(vinyl alcohol) compound (A) or another water-soluble polymer was fed into the extruder and mixed at temperatures between 170 and 260° C. (depending on the melting point of the polyamide). Thereafter, the organic or inorganic filler was added. An additional plasticizer was not absolutely necessary in this case. The thermoplastic mixture was finally comminuted to form granules.

If a very high melting temperature is required (230 to 260° C.), care must be taken to ensure as short a residence time as possible of the poly(vinyl alcohol) compound (A) or the water-soluble polymer, since otherwise significant decomposition reactions occur. It is expedient in this case to use natural materials which are as high-temperature stable as possible, such as cellulose, or to consider the use of inorganic fillers.

II. Production of Tubular Casings

The granules produced by variant B or C were processed by a tubular film-blowing method or by biaxial stretch orientation to form a tubular film.

It is also possible to produce the granules (B) and (C) without producing the product obtained by variant (A) or without the water-soluble polymer, these last-mentioned components then not being added to the extruder until just before processing to form the tubular film in order as far as possible to avoid a double thermal stress.

In the examples the following were used:
nylon-6/6.6 (®Ultramid C4 from BASF Aktiengesellschaft)
nylon-6 (®Grilon F40 from Ems Chemie AG)
poly(vinyl alcohol) (PVAL) having a mean molecular weight MW of 26 000 and a degree of saponification of 88% (®Mowiol 26-88 from Hoechst AG)
poly(ethylene glycol) (PEG) having a mean degree of polymerization of 300, ®Genapol PEG 300 from Hoechst AG
96% pure glycerol, purity as specified in DAB (Deutsches Arzneimittelbuch [German Pharmacopeia])
filler batch, masterbatch of calcium carbonate and nylon 6, Grilon XE 3690 from Ems Chemie AG
nylon 6-poly(ethylene glycol) block copolymer (®Pebax MH 1657 SA from Elf Atochem S.A.)

Composition and properties of the tubular casings according to the examples 1 to 17 are listed in tables 1 to 4.

TABLE 1

| Example | Polyamides/water-soluble polymers | | Filler/plasticizer | | Method and granules |
|---|---|---|---|---|---|
| 1 | 34.0% by wt. | Grilon F40 | 18.5% by wt. | Corn starch | Tubular film-blowing method |
|  | 10.0% by wt. | Ultramid C4 | 7.5% by wt. | Glycerol | Granules according to variant B |
|  | 30.0% by wt. | Poly(vinyl alcohol) compound | | | |
| 2 | 42.5% by wt. | Ultramid C4 | 23.0% by wt. | Corn starch | Tubular film-blowing method |
|  | 25.0% by wt. | Poly(vinyl alcohol) compound | 9.5% by wt. | Glycerol | Granules according to variant B |
| 3 | 40.0% by wt. | Grilon F40 | 3.0% by wt. | Corn starch | Tubular film-blowing method |
|  | 25.0% by wt. | Pebax MH 1657 | 3.0% by wt. | Guar seed meal | Granules according to variant B |
|  | 25.0% by wt. | Poly(vinyl alcohol) compound | 4.0% by wt. | Glycerol | |
| 4 | 43.0% by wt. | Grilon F40 | | | Tubular film-blowing method |
|  | 25.0% by wt. | Pebax MH 1657 | 4.5% by wt. | Cellulose powder | Granules according to variant B |
|  | 25.0% by wt. | Poly(vinyl alcohol) compound | 2.5% by wt. | Glycerol | |
| 5 | 68.0% by wt. | Grilon F40 | 4.5% by wt. | Cellulose powder | Tubular film-blowing method |
|  | 25.0% by wt. | Poly(vinyl alcohol) compound | 2.5% by wt. | Glycerol | Granules according to variant B |
| 6 | 52.0% by wt. | Grilon F40 | | | Tubular film-blowing method |
|  | 40.0% by wt. | Poly(vinyl alcohol) compound | 8.0% by wt. | Microglass beads | Granules according to variant C |
| 7 | 67.0% by wt. | Grilon F40 | | | Tubular film-blowing method |
|  | 25.0% by wt. | Poly(vinyl alcohol) compound | 8.0% by wt. | Microglass beads | Granules according to variant C |
| 8 | 41.0% by wt. | Grilon F40 | | | Tubular film-blowing method |
|  | 25.0% by wt. | Pebax MH 1657 | | | Granules according to variant C |
|  | 25.0% by wt. | Poly(vinyl alcohol) compound | 9.0% by wt. | Microglass beads | |
| 9 | 38.0% by wt. | Ultramid C4 | | | Biaxial stretch orientation |
|  | 22.0% by wt. | Poly(vinyl alcohol) compound | 9.0% by wt. | Corn starch | Granules according to variant B |
|  | 22.0% by wt. | Pebax MH 1657 | 3.5% by wt. | Glycerol | |
|  | 5.0% by wt. | Grilon XE 3690 | | | |
| 10 | 33.5% by wt. | Ultramid C4 | | | Biaxial stretch orientation |
|  | 22.0% by wt. | Poly(vinyl alcohol) compound | 12.5% by wt. | Corn starch | Granules according to variant B |
|  | 22.0% by wt. | Pebax MH 1657 | 5.0% by wt. | Glycerol | |
|  | 5.0% by wt. | Grilon XE 3690 | | | |

TABLE 2

| Example No. | WVP)[1] [g/m²·d] | σ₁₅ value)[2] [N/mm²] longitudinal | σ₁₅ value)[2] [N/mm²] transverse | Tear strength)[2] [N/mm²] longitudinal | Tear strength)[2] [N/mm²] transverse | Elongation at break)[2] [%] longitudinal | Elongation at break)[2] [%] transverse | Roughness [μm] $R_a$ | Roughness [μm] $R_z$ | Roughness [μm] $R_{max}$ | Glossiness 20° | Glossiness 60° | Glossiness 85° | Film thickness [μm] |
|---|---|---|---|---|---|---|---|---|---|---|---|---|---|---|
| 1 | 171 | 14 | 13 | 42 | 28 | 411 | 305 | 1.5 | 8 | 14 | 0.4 | 5.9 | 1.2 | 44-56 |
| 2 | 267 | 20 | 18 | 43 | 39 | 381 | 342 | 2.1 | 9.8 | 14 | 0.3 | 2.5 | 3.8 | 45-72 |
| 3 | 208 | 10 | 9 | 20 | 12 | 250 | 150 | 5 | 27 | 46 | 0.6 | 6.6 | 5 | 75-95 |
| 4 | 171 | 11 | 10 | 29 | 21 | 320 | 264 | 3.8 | 22 | 26 | 0.6 | 6.3 | 4.7 | 80-90 |
| 5 | 100 | 14 | 13 | 25 | 21 | 253 | 224 | 4 | 22 | 26 | 0.6 | 6.1 | 4.2 | 60-70 |
| 6 | 164 | 16 | 15 | 27 | 20 | 210 | 100 | 3 | 16 | 25 | 1.5 | 11.5 | 18 | 70-80 |
| 7 | 135 | 18 | 16 | 28 | 22 | 240 | 160 | 2.8 | 15 | 23 | 1.6 | 12 | 19 | 70-80 |
| 8 | 157 | 11 | 11 | 27 | 22 | 320 | 306 | 3.2 | 17 | 27 | 1.3 | 11 | 18 | 70-80 |
| 9 | 204 | 12 | 13 | 50 | 48 | 110 | 75 | — | — | — | — | — | — | 30-38 |
| 10 | 214 | 10 | 11 | 45 | 43 | 90 | 74 | — | — | — | — | — | — | 32-39 |

)[1]WVP = water vapor permeability. The casing in this case was exposed on one side to air of a relative humidity of 85% at 23° C.

)[2]Examples 9 and 10 were determined on wet samples of 15 mm width at a clamped length of 50 mm, Examples 1 to 8 on dry samples

TABLE 3

| Example | Polyamides/water-soluble polymers | | Filler/plasticizer | | Method and granules |
|---|---|---|---|---|---|
| 11 | 42.5% by wt. | Ultramid C4 | 23.5% by wt. | Corn starch | Tubular film-blowing method |
|  | 25.0% by wt. | Poly(vinyl alcohol) compound | 9.0% by wt. | Glycerol | Granules according to variant B |
| 12 | 46.0% by wt. | Grilon F40 |  |  | Tubular film-blowing method |
|  | 10.0% by wt. | Poly(vinyl alcohol) compound | 6.0% by wt. | Cellulose | Granules according to variant C |
|  | 38.0% by wt. | Pebax MH 1657 |  |  |  |
| 13 | 45.0% by wt. | Grilon F40 |  |  | Tubular film-blowing method |
|  | 5.0% by wt. | Poly(vinyl alcohol) compound | 8.0% by wt. | Cellulose | Granules according to variant C |
|  | 42.0% by wt. | Pebax MH 1657 |  |  |  |
| 14 | 48.0% by wt. | Grilon F40 |  |  | Tubular film-blowing method |
|  | 5.0% by wt. | Poly(vinyl alcohol) compound | 4.0% by wt. | Cellulose | Granules according to variant C |
|  | 43.0% by wt. | Pebax MH 1657 |  |  |  |
| 15 | 46.0% by wt. | Grilon F40 |  |  | Tubular film-blowing method |
|  | 10.0% by wt. | Poly(vinyl alcohol) compound | 4.0% by wt. | Guar corn meal | Granules according to variant C |
|  | 40.0% by wt. | Pebax MH 1657 |  |  |  |
| 16 | 37.0% by wt. | Ultramid C4 |  |  | Tubular film-blowing method |
|  | 10.0% by wt. | Grilon CF6S |  |  | Granules according to variant C |
|  | 5.0% by wt. | Poly(vinyl alcohol) compound | 6.0% by wt/ | Cellulose |  |
|  | 42.0% by wt. | Pebax MH 1657 |  |  |  |
| 17 | 43.0% by wt. | Grilon F40 |  |  | Tubular film-blowing method |
|  | 5.0% by wt. | Poly(vinyl alcohol) compound | 4.0% by wt. | Cellulose | Granules according to variant B |
|  | 45.0% by wt. | Pebax MH 1657 | 3.0% by wt. | Glycerol |  |

TABLE 4

| Example No. | WVP)[1] [g/m²·d] | σ₁₅ value)[2] [N/mm²] longitudinal | σ₁₅ value)[2] [N/mm²] transverse | Tear strength)[2] [N/mm²] longitudinal | Tear strength)[2] [N/mm²] transverse | Elongation at break)[2] [%] longitudinal | Elongation at break)[2] [%] transverse | Film thickness [μm] |
|---|---|---|---|---|---|---|---|---|
| 11 | 302 | 17 | 15 | 46 | 39 | 436 | 434 | 50-70 |
| 12 | 456 | 15 | 13 | 17 | 15 | 78 | 51 | 130-150 |
| 13 | 517 | 15 | 13 | 18 | 15 | 69 | 51 | 130-150 |
| 14 | 572 | 14 | 12 | 23 | 20 | 202 | 148 | 100-120 |
| 15 | 631 | 15 | 13 | 26 | 22 | 328 | 244 | 95-115 |
| 16 | 760 | 8 | 8 | 20 | 15 | 329 | 261 | 80-98 |
| 17 | 1050 | 11 | 9 | 20 | 16 | 242 | 210 | 76-85 |

)[1]WVP = water vapor permeability. The casing in this case was exposed on one side to air of a relative humidity of 85% at 23° C.

)[2]Examples 11 to 17 were determined as specified in DIN 53 455 on dry samples of 15 mm width at a clamped length of 50 mm.

The invention claimed is:

1. A single layered tubular sausage casing made from or a multi-layered tubular sausage casing comprising an outer layer made from a thermoplastic mixture which comprises at least one aliphatic polyamide and/or copolyamide, at least one synthetic water-soluble polymer which is not extractable from the casing by hot or cold water, and at least one organic and/or inorganic filler which is present in an amount sufficient to give the casing a very natural matt-silk optical and haptic quality, to reinforce the casing and to increase smoke permeability of the casing, said organic filler being selected from the group consisting of carbohydrates, organic synthetic fibers and organic synthetic powders, the organic filler having an average fiber length or particle size of from 5 to 3,000 μm, and said inorganic filler being selected from the group consisting of fibers and/or beads and/or powders of glass, rock wool short fibers, basalt wool, slag wool, mineral wool fibers, carbonates, sulfates, silicates, oxides and carbon fibers, the inorganic filler having a particle size or fiber length of 0.1 to 3,000 μm, and wherein the casing, in an unstretched, monoaxially or biaxially stretched state, has a water vapor permeability of 50 to 1,200 $g/m^2 \cdot d$, and wherein said casing has a thickness of about 40 to about 200 82 m, and wherein the aliphatic polyamide and/or copolyamide is a nylon-4.6, nylon-6, nylon-6.6, nylon-6/6.6, nylon-6.9, nylon-6.10, nylon-6.12, nylon-6/66.9, nylon-6/66.12, nylon-12 and/or a heterofunctional polyamide, the fraction of the aliphatic polyamide and/or copolyamide being 2 to 99% by weight, based on the total weight of the mixture.

2. The tubular sausage casing as claimed in claim 1, wherein the water-soluble synthetic polymer is a homo- and/or copolymer having units of vinylpyrrolidone, N-vinylalkyamide, alkyloxazoline, alkyl glycol, vinyl alcohol, vinyl alcohol ether, vinyl alcohol ester, acrylamide, alkylene oxide, (meth)acrylic acid, maleic acid and/or cellulose ether, the fraction of which is 1 to 50% by weight, based on the total weight of the mixture.

3. The tubular sausage casing as claimed in claim 2, wherein the synthetic water-soluble polymer is a poly(vinyl alcohol) having a mean molecular weight $M_w$ from 10,000 to 50,000, and a degree of saponification of the acetate groups from 75 to 98%.

4. The tubular sausage casing is claimed in claim 1, wherein the filler is swellable.

5. The tubular sausage casing as claimed in claim 1, wherein the inorganic filler comprises microglass beads which have a mean particle size of 1 to 250 μm.

6. The tubular sausage casing as claimed in claim 5, wherein a surface of the microglass beads is modified by an adhesion promoter which improves the adhesion to surrounding polymers.

7. The tubular sausage casing as claimed in claim 1, wherein the fraction of the filler is 1 to 50% by weight, based on the total weight of the thermoplastic mixture.

8. The tubular sausage as claimed in claim 1, wherein said casing additionally comprises a plasticizer, the fraction of plasticizer being up to 40% by weight, based on the total weight of the thermoplastic mixture.

9. A method for producing a tubular sausage casing as claimed in claim 1, comprising:
    extruding or co-extruding the thermoplastic mixture having at least one aliphatic polyamide and/or copolyamide and at least one synthetic water-soluble polymer and at least one inorganic and/or organic filler to form a tubing; and
    processing the resultant tubing by film-blowing which yields a non-oriented film, or by mono- or biaxial stretching, which yields an oriented film.

10. The method as claimed in claim 9, wherein the tubing is further processed to form sections tied off at one end and/or to form a shirred stick.

11. The method as claimed in claim 9, wherein the tubing is further processed to give a natural-skin-like form.

12. A method for producing an artificial sausage casing, comprising forming said food casing of claim 1, to produce said artificial sausage casing.

13. A tubular sausage casing of claim 8, wherein said fraction is from 1-35% by weight.

14. A tubular sausage casing of claim 8, wherein said fraction is from 2-30% by weight.

15. A tubular sausage casing of claim 1, wherein said heterofunctional polyamide comprises polyetheramide, polyesteramide, polyetheresteramide and/or a polyamide urethane.

16. The tubular sausage casing as claimed in claim 1, wherein the water-soluble synthetic polymer is a homo- and/or copolymer having units of vinylpyrrolidone, N-vinylalkylamide, alkyloxazoline, alkyl glycol, vinyl alcohol, vinyl alcohol ether, vinyl alcohol ester, acrylamide, alkylene oxide, (meth)acrylic acid, maleic acid and/or cellulose ether, the fraction of which is 1 to 50% by weight, based on the total weight of the mixture.

17. The tubular sausage casing as claimed in claim 1,
    C) wherein said casing has glossiness at 60° of between about 2.5 and about 12.

18. The tubular sausage casing of claim 17, wherein said casing has glossiness at 20° of between about 0.3 and about 1.6.

19. The tubular sausage casing of claim 17, wherein said casing has glossiness at 85° of between about 1.2 and about 19.

20. The tubular sausage casing as claimed in claim 1,
    C) wherein said casing has roughness ($R_a$) value of between about 1.5 μm and about 5 μm.

21. The tubular sausage casing of claim 1, wherein said casing has a thickness of about 25 to about 75 μm.

* * * * *

UNITED STATES PATENT AND TRADEMARK OFFICE
CERTIFICATE OF CORRECTION

| | | |
|---|---|---|
| PATENT NO. | : 7,976,942 B2 | Page 1 of 1 |
| APPLICATION NO. | : 10/555168 | |
| DATED | : July 12, 2011 | |
| INVENTOR(S) | : Stefanie Stalberg, Ulrich Delius and Bernhard Feron | |

It is certified that error appears in the above-identified patent and that said Letters Patent is hereby corrected as shown below:

Column 13, Line 23
"200 82 m," should be
--200 µm,--

Column 14, Line 40
"C) wherein" should be
--wherein--

Column 14, Line 49
"C) wherein" should be
--wherein--

Signed and Sealed this
Thirtieth Day of August, 2011

David J. Kappos
*Director of the United States Patent and Trademark Office*